(12) United States Patent
Vanvolsem et al.

(10) Patent No.: US 9,097,161 B2
(45) Date of Patent: Aug. 4, 2015

(54) MIXING DEVICE IN AN EXHAUST GAS PIPE

(71) Applicant: RENAULT TRUCKS, Saint Priest (FR)

(72) Inventors: Michel Vanvolsem, Montagnieu (FR); Julien Ampere, Villeurbanne (FR)

(73) Assignee: Volvo Trucks AB, Göteborg (SE)

( * ) Notice: Subject to any disclaimer, the term of this patent is extended or adjusted under 35 U.S.C. 154(b) by 58 days.

(21) Appl. No.: 14/078,183

(22) Filed: Nov. 12, 2013

(65) Prior Publication Data

US 2014/0069087 A1  Mar. 13, 2014

Related U.S. Application Data

(63) Continuation of application No. 13/062,720, filed as application No. PCT/IB2008/003128 on Sep. 19, 2008, now Pat. No. 8,745,978.

(51) Int. Cl.
*F01N 1/00* (2006.01)
*F01N 3/02* (2006.01)
(Continued)

(52) U.S. Cl.
CPC ........ *F01N 3/10* (2013.01); *B01D 53/90* (2013.01); *B01F 3/04049* (2013.01); *B01F 5/0473* (2013.01); *B01F 5/0618* (2013.01); *B01F 5/0682* (2013.01); *B01F 5/0688* (2013.01); *F01N 3/2066* (2013.01); *F01N 3/2892* (2013.01); *B01D 2251/2067* (2013.01); *B01D 2257/404* (2013.01); *B01D 2258/012* (2013.01);
(Continued)

(58) Field of Classification Search
CPC ....... F01N 3/10; F01N 3/2066; F01N 3/2892; F01N 2240/20; F01N 2570/14; F01N 2610/02; F01N 2510/1453; B01D 53/90; B01D 2251/2067; B01D 2257/04; B01D 2258/012; B01F 3/04049; B01F 5/0473; B01F 5/0618; B01F 5/0682; B01F 5/0688; B01F 2005/0626; B01F 2005/0639; Y02T 10/24
USPC ............................ 60/295, 301, 303, 317, 324
See application file for complete search history.

(56) References Cited

U.S. PATENT DOCUMENTS 6,561,440 B1   5/2003  Hofherr
2010/0107617 A1 *  5/2010  Kaiser et al. .................... 60/324

FOREIGN PATENT DOCUMENTS

CN        2843580 Y        12/2006
WO    WO 2008061734 A1 *   5/2008   ............... F01N 3/20

OTHER PUBLICATIONS

Official Action (Dec. 12, 2004) for corresponding Chinese Application 200880131184.8

(Continued)

*Primary Examiner* — Audrey K Bradley
(74) *Attorney, Agent, or Firm* — WRB-IP LLP

(57) ABSTRACT

In an exhaust gas pipe, a first fluid flows in a flow direction in the pipe, and a second fluid is injected inside the pipe by a nozzle, from an injection inlet arranged in the pipe wall, according to an injection direction. A mixing device fastened inside the pipe upstream from the injection inlet creates turbulence that helps the mixing of the fluids. The mixing device has a first portion located on the injection inlet side of the pipe and a second portion located opposite the injection inlet side of the pipe, the portions being designed so that the fluid velocity is higher downstream from the mixing device second portion than downstream from the mixing device first portion. An aqueous solution of urea can be injected inside an exhaust pipe of a diesel engine.

4 Claims, 2 Drawing Sheets

(51) Int. Cl.
*F01N 3/10* (2006.01)
*B01D 53/90* (2006.01)
*B01F 3/04* (2006.01)
*B01F 5/04* (2006.01)
*B01F 5/06* (2006.01)
*F01N 3/20* (2006.01)
*F01N 3/28* (2006.01)

(52) U.S. Cl.
CPC . *B01F 2005/0626* (2013.01); *B01F 2005/0639* (2013.01); *F01N 2240/20* (2013.01); *F01N 2570/14* (2013.01); *F01N 2610/02* (2013.01); *F01N 2610/1453* (2013.01); *Y02T 10/24* (2013.01)

(56) References Cited

OTHER PUBLICATIONS

CN1612784, published May 4, 2005 (corresponds to US6561440).

* cited by examiner

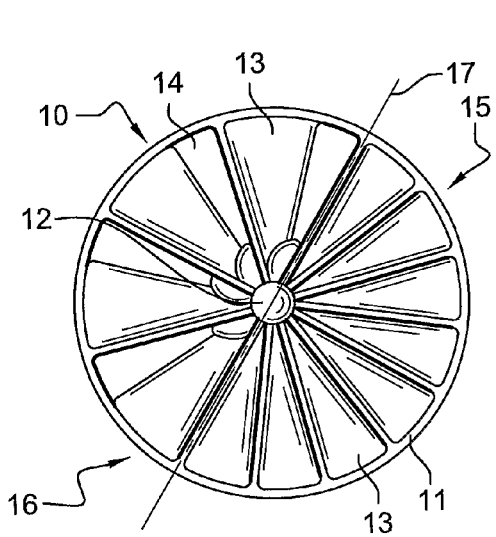
Fig. 2
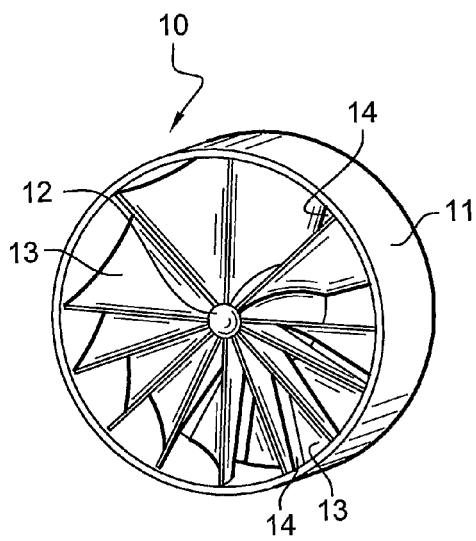
Fig. 3
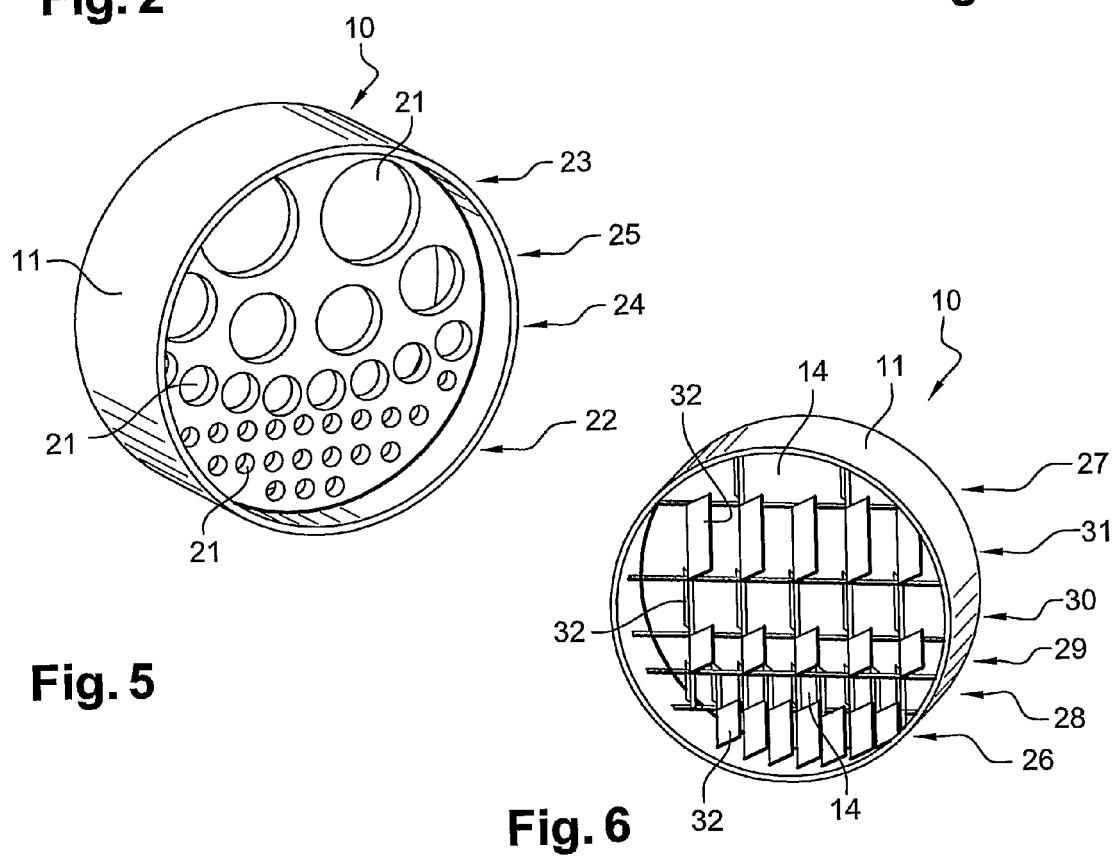
Fig. 5
Fig. 6

MIXING DEVICE IN AN EXHAUST GAS PIPE

BACKGROUND AND SUMMARY

The present application is a divisional application of U.S. application Ser. No. 13/0627 filed Mar. 8, 2011, which is the U.S. national stage of International Application PCT/IB2008/003128, filed Sep. 19, 2008, both of which are incorporated by reference.

The present invention relates to a mixing device, especially designed to improve the mixing of two fluids such as exhaust gases from a diesel engine and an aqueous solution of urea.

Exhaust gas formed in the combustion of fuel in an internal combustion engine contains a proportion of undesirable substances such as nitrogen oxides (NOx), carbon monoxide (CO), un-burnt hydrocarbons (HC), soot, etc.

To reduce air pollution, vehicles are therefore equipped with various systems that deal with undesirable substances in exhaust gas.

A common exhaust gas treatment is a so called selective catalytic reduction (SCR). Exhaust gas wherein ammonia is added as a reducer is treated in a specific catalytic converter here nitrogen oxides are converted into water and nitrogen which are both non toxic substances. Ammonia is introduced in the formula in an aqueous solution from which ammonia is obtained through hydrolysis. Urea is usually nebulised in the exhaust gas upstream of the catalytic converter. To this end, a urea injection nozzle is fitted on the exhaust line upstream the catalytic converter.

A problem with this type of exhaust gas treatment is that, before it has transformed into ammonia, urea can crystallize. In concrete terms, the aqueous solution of urea which is sprayed through the nozzle inside the exhaust pipe, according to a direction which is angled with respect to the exhaust gases flow direction, tends to form a solid deposit on the exhaust gas pipe wall, on the internal side thereof, opposite of the injection point. The consequence is that the cross section of the exhaust pipe is progressively reduced, which makes the engine efficiency decrease and which can seriously impair the engine operation in the long term.

It therefore appears that there is room for improvement in the treatment of exhaust gases of industrial vehicles.

It is desirable to provide a mixing system between two fluids which ensures a satisfactory mixing of said fluids into a pipe but prevents the injected fluid from forming a deposit onto the pipe surface, especially opposite the injection point.

An aspect of the invention concerns a mixing system comprising a pipe in which a first fluid can flow in a flow direction, a nozzle designed to inject a second fluid inside the pipe from an injection inlet arranged in the pipe wall, according to an injection direction.

Said mixing system further comprises a mixing device positioned inside the pipe upstream from the injection inlet; said mixing device has, at least, a first portion proximal to the injection inlet and a second portion distal to the injection inlet, said first and second portions being designed so that the velocity of the first fluid is higher downstream from the mixing device second portion than downstream from the mixing device first portion.

Thus, the invention provides a mixing device making it possible to obtain an asymmetrical velocity profile downstream from said device (as seen in the pipe median plane containing the nozzle axis). As a consequence, opposite the injection inlet, the first fluid flows quickly and drags the second fluid, making it deviate downstream with respect to its injection direction, thereby preventing said second fluid from hitting the pipe and making a deposit on it.

This result is obtained without impairing the mixing efficiency, since (i) the mixing device is designed to generate turbulence, thereby contributing to a better mixing of the fluids and (ii) the first fluid velocity downstream from said mixing device is not uniformly high, which would not provide enough time for both fluids to efficiently mix before they reach the pipe outlet.

It has to be noted that the mixing device is located close to the injection inlet, so that the velocity profile is substantially not altered when the first and second fluids meet.

Preferably, said first and second portions have several passageways for the first fluid, said passageways having a greater combined cross section in the second portion compared with the first portion. This arrangement ensures that an asymmetrical velocity profile can be obtained downstream from said mixing device.

Preferably, said first portion of the mixing device generates more turbulence in the first fluid flow than the second portion.

At least said first portion of the mixing device may comprise flow diverting members.

In an implementation of the invention, said mixing device can consist of or comprise said first and second portions, said portions being shaped as half discs and being located on both sides of the pipe diameter plane which is orthogonal to the pipe median plane containing the nozzle axis.

Alternatively, said mixing device can comprise at least one intermediate portion located between said first and second portions, said intermediate portion being designed so that the first fluid velocity downstream from the mixing device intermediate portion is higher than downstream from the mixing device first portion and lesser than downstream from the mixing device second portion. With this arrangement, a progressively increasing velocity of the first fluid can be achieved.

For example, the passageways can have a substantially constant size and can be arranged at substantially regular intervals in at least one or each of the mixing device portions.

In an advantageous way, the mixing device may comprise several successive intermediate portions arranged as substantially parallel strips between said first and second portions, the passageways having an increasing combined cross-section from the first portion towards the second portion.

The mixing system may comprise several portions arranged as angular sectors as in pie-chart.

In order to easily fasten the mixing device inside the pipe, it is envisaged that the mixing device comprise a substantially cylindrical sleeve designed to be fastened axially inside the pipe, said at least first and second portions being arranged inside said sleeve.

According to a first embodiment of the invention, said mixing device comprises a central axis substantially identical to the pipe axis and blades (preferably helical blades) extending radially from said central axis, the spacing between successive blades being greater in the second portion compared with the first portion. This type of device is able to create a swirl movement of the fluids, thereby ensuring a particularly efficient mixing.

According to a second embodiment of the invention, said mixing device comprises a plate equipped with a plurality of holes, the combined cross-section of the holes being greater in the second portion compared with the first portion.

According to a third embodiment of the invention, said mixing device comprises, in each of said at least first and second portions, a plurality of fins angled with respect to the flow direction, said fins generating more turbulence in the first portion than in the second portion. This type of device is also able to generate turbulence helping the mixing of both fluids.

A specific application of the invention is the treatment of NOx in exhaust gases. In that case, said pipe is an exhaust pipe of a diesel engine and said second fluid is an aqueous solution of urea.

The invention makes it possible to obtain a satisfactory mixing between exhaust gases and urea and then, further downstream, between NOx and ammonia when urea has broken down. Therefore, it is possible to effectively reduce the NOx compounds and to achieve considerably lower NOx emissions. At the same time, the invention effectively prevents urea that has not broken down into ammonia yet from making a deposit on the pipe opposite its injection pipe, thereby increasing the service life of said exhaust pipe.

These and other advantages will become apparent upon reading the following description in view of the drawing attached hereto representing, as non-limiting examples, embodiments of a vehicle according to the invention.

BRIEF DESCRIPTION OF THE DRAWING

The following detailed description of several embodiments of the invention is better understood when read in conjunction with the appended drawing being understood, however, that the invention is not limited to the specific embodiments disclosed. In the drawing.

FIG. 2 is a front view of a mixing device according to a first embodiment of the invention;

FIG. 3 is a perspective view of the mixing device of FIG. 2;

FIG. 5 is a perspective view of a mixing device according to a second embodiment of the invention;

FIG. 6 is a perspective view of a mixing device according to a third embodiment of the invention.

DETAILED DESCRIPTION

Figure 1:
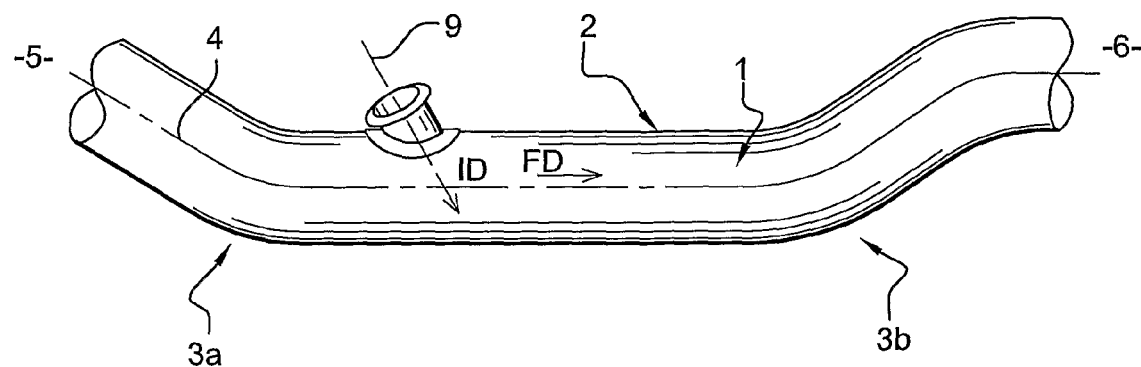
FIG. 1 is a diagrammatic side view of an exhaust pipe comprising an injection nozzle and a mixing device according to the invention, located upstream from said injection nozzle.

FIG. 1 shows a pipe 1 which is an exhaust pipe of an diesel engine. Pipe 1 can include a straight portion 2 as well as several bends 3a, 3b. Pipe 1 has a central axis 4 which extends longitudinally in straight portion 2. A first fluid, here constituted by the engine exhaust gases, can flow inside pipe 1 from its inlet 5, on the engine side, towards its outlet 6, where said gases are released into the atmosphere after going through a non depicted catalytic converter. The general flow direction FD of exhaust gases is parallel to the pipe central axis 4. The words "upstream" and "downstream" are used with respect to said flow direction FD.

An injection inlet 7 is provided in the pipe wall, a nozzle 8 being arranged in said injection inlet 7. Nozzle 8 is designed to inject a second fluid inside pipe 1, here comprising an aqueous solution of urea, through injection inlet 7, according to an injection direction ID. Said injection direction ID is roughly oriented downstream, while also being angled with respect to said flow direction FD. For example, the corresponding angle may be around 30°-75°.

The pipe median plane P is defined as the plane containing the pipe central axis 4 and the nozzle axis 9, said nozzle axis 9 being substantially identical to the injection direction ID. In operation, plane P may be substantially vertical.

A mixing device 10 is fastened inside pipe 1, upstream from injection inlet 7 and close to it.

As this is illustrated in FIGS. 2 to 6, said mixing device 10 comprises a substantially cylindrical sleeve 11 whose outer diameter is substantially the same as the pipe inside diameter, so that said mixing device 10 can be fastened inside pipe 1, the sleeve axis being identical to the pipe central axis 4. The central pan of mixing device 10, which is disc-shaped, takes up the entire pipe cross section. Thus, when flowing downstream, exhaust gases necessarily go through mixing device 10.

A first embodiment of mixing device 10 is now described with reference to FIGS. 2 and 3.

Said mixing device 10 comprises a central axis 12 substantially identical to the pipe axis 4 and a plurality of helical blades 13 extending radially from said central axis 12. Each helical blade is a flow diverting member which affects the flow of the first fluid. Passageways 14 are formed between two successive blades 13. It has to be noted that helical blades 13 are fixed, and do not rotate with respect to pipe axis 4.

Mixing device 10 has a first and a second portions 15, 16 inside sleeve 11, which are shaped as half discs and are located on both sides of the diameter plane 17 of mixing device 10 which is orthogonal to the pipe median plane P. First portion 15 is located on the side of nozzle 8, whereas second portion 16 is located opposite nozzle 8.

In each of first and a second portions 15, 16, the blades 13 are substantially regularly arranged. However, in second portion 16, the spacing between successive blades 13 is greater compared with first portion 15, for example twice as great. The drawings show a mixing device 10 whose first portion 15 comprises eight blades and whose second portion 16 comprises four blades. As a result, the width of one passageway 14 is greater in second portion 16, but the passageway density is greater in first portion 15 (i.e. there are more passageways 14 in first portion 15). All in all the combined surface (or in other words the combine cross-section) of the passageways in the first portion is lower than the combined surface of the passageways in the second portion.

Figure 4:
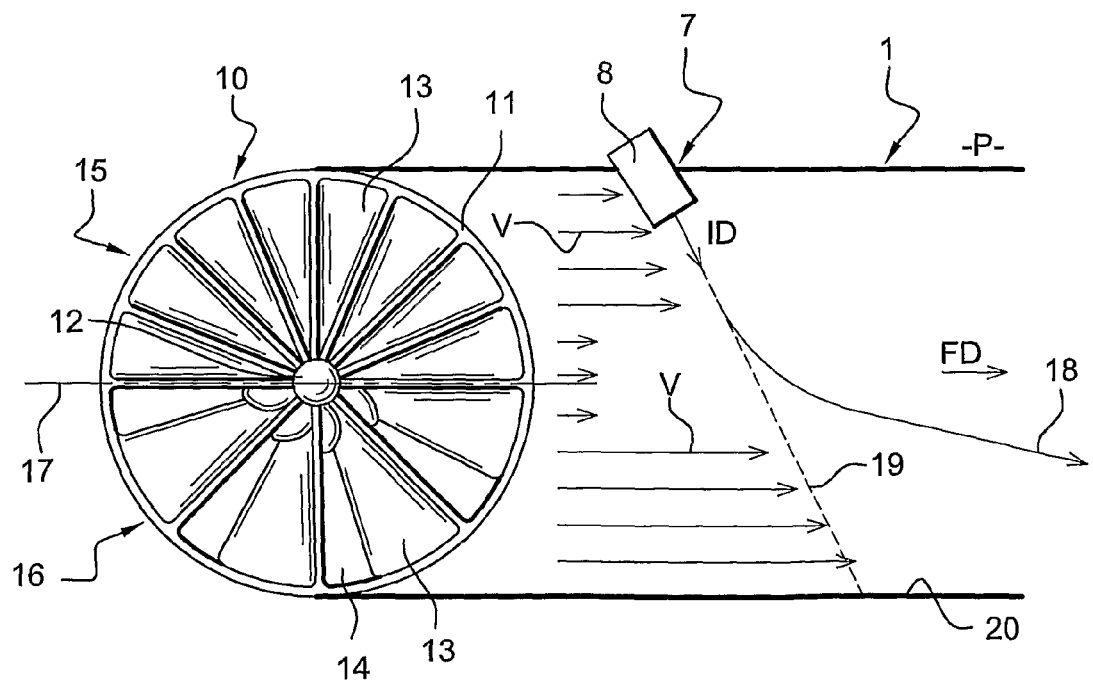
FIG. 4 is a diagrammatic view of the exhaust pipe of FIG. 1 equipped with the mixing device of FIG. 2, showing the velocity field in said pipe downstream from said mixing device, in the pipe median plane containing the nozzle axis.

As shown on FIG. 4 (where pipe 1 is illustrated in plane P while mixing device 10 is illustrated in a position turned by 90°), the technical effect of mixing device 10 is to generate an asymmetrical velocity profile downstream from said mixing device 10 and upstream from nozzle axis 9. Because of the lower surface available for the flow of exhaust gases in second portion 16. the exhaust gases velocity v is higher downstream from said second portion 16 than downstream from first portion 15.

In this first embodiment, all the blades are identical and only their spacing, differs from one portion to the other. A similar result could be used where the number of blades is similar in both portions, and/or where the combined surface of the passageways would be substantially equal in both portions, but where the blades would be of a different shape in the two portions so as to generate more turbulence in the first portion than in the second portion.

Consequently, opposite nozzle 8, the exhaust gases flowing more quickly force the injected aqueous solution of urea to follow a path 18 which deviates downstream with respect to the path 19 (shown in dotted line) it would have follow without mixing device 10. As a result, no urea or less urea hit the corresponding pipe inner surface 20 and the solid deposits are considerably reduced.

Thanks to the asymmetrical velocity field it creates, the mixing device according to the invention makes it possible to compensate the asymmetry induced by the nozzle injection direction in the pipe.

One further advantage of the first embodiment of mixing device 10 according to the first embodiment is that it generates a helical flow, also called a swirl, which improves the mixing between exhaust gases and urea droplets and therefore leads to a more effective NOx reduction.

A second embodiment of mixing device 10 is now described with reference to FIG. 5.

Said mixing device 10 comprises a plate member which is installed in the pipe substantially perpendicularly to the pipe central axis 4. Said plate member has a plurality of circular holes 21 substantially arranged in successive parallel strips which are orthogonal to the pipe median plane P. Said mixing device 10 thus comprises a first strip 22 of holes intended to be located on the side of nozzle 8, a second strip 23 of holes intended to be located opposite nozzle 8, and two successive intermediate strips 24, 25 of holes arranged between said first and second strips 22, 23.

In each strip, the diameter and the spacing between holes 21 is substantially constant. However, the hole diameter progressively increases from first strip 22 towards second strip 23, and the density of holes 21 progressively decreases from first strip 22 towards second strip 23. All in all, the combined surface of the holes of one strip increases from the first strip 22 towards the second strip 23.

When properly fastened inside a pipe 1, said mixing device 10 generates an asymmetrical velocity field downstream, as explained for the first embodiment.

Finally, FIG. 6 shows a third embodiment of a mixing device 10.

Said mixing device 10 comprises a plurality of successive parallel strips, namely a first strip 26 intended to be located on the side of nozzle 8, a second strip 27 intended to be located opposite nozzle 8, and four successive intermediate strips 28, 29, 30, 31 arranged between said first and second strips 26, 27. The strips are separated one from the other by planar blades which are oriented parallel to the flow direction and perpendicular to the pipe median plane P.

In each strip 26-31 are provided a plurality of substantially identical, vertical and parallel fins 32 which are angled with respect to the flow direction and substantially regularly spaced. Each fin can be considered as a flow diverting member. Within one strip, passageways 14 are therefore defined between two successive fins 32. Said fins 32 have alternating directions with respect to said flow direction in successive strips 26-31. In addition, the strips height and the spacing between fins 32 progressively increase from first strip 26 towards second strip 27.

In the depicted embodiment, the fins 32 are more numerous in the first portion of the mixing device which is on the nozzle side (strips 26, 28, 29) than in the second portion (strips 27, 31). In the embodiment, the respective fins have substantially the same angulation in absolute value with respect to the flow direction. Therefore, the mixing device has a higher tendency to slow down the flow in its first portion were the combined surface of the fins is higher than in the second portion.

When properly fastened inside a pipe 1, said mixing device 10 generates an asymmetrical velocity field downstream as explained for the first embodiment. This asymmetry of the downstream velocity field could also derive from the respective angulations of the fins 32 with respect to the flow direction. Indeed, each fin will generate more turbulence the more it is angled, and will therefore tend to locally diminish the speed of the flow through the mixing device. Also to be taken into account is the respective angulations of the neighbouring fins which may contribute to inducing even more turbulence.

Both second and third embodiments generate the required turbulence, so as to obtain an effective mixing, but do not generate a helical movement, although the third embodiment could be easily modified to obtain such helical downstream flow by a proper orientation of the fins 32.

In a further non depicted embodiment of the invention, the mixing device could be divided in portions as in a pie-chart, where each portion is an angular sector of the pie chart. It could for example have four sectors extending angularly around 90 degrees, with two opposites sectors forming, the first and second portions and the two other opposite sectors forming an intermediate portion.

The invention is not restricted to the embodiment described above by way of non-limiting example, but on the contrary it encompasses all embodiments thereof.

The invention claimed is:

1. A mixing device for mixing of fluids inside a pipe, comprising:
   a circular periphery and a central axis;
   a plurality of blades in an interior of the mixing device, the blades defining a plurality of strips arid extending parallel to the central axis; and
   a plurality of fins associated with respective ones of the plurality of strips, the fins being angled with respect to the central axis,
   wherein the central axis lies along a diameter plane of the mixing device, the diameter plane defining a first portion and a second portion located on opposite sides of the diameter plane,
   wherein the blades are parallel to each other, and
   wherein a distance between blades is greater in the second portion than in the first portion.

2. A mixing device for mixing of fluids inside a pipe, comprising:
   a circular periphery and a central axis;
   a plurality of blades in an interior of the mixing device, the blades defining a plurality of strips and extending parallel to the central axis; and
   a plurality of fins associated with respective ones of the plurality of strips, the fins being angled with respect to the central axis,
   wherein the central axis lies along a diameter plane of the mixing device, the diameter plane defining a first portion and a second portion located on opposite sides of the diameter plane,
   the mixing device comprising at least one first strip in the first portion and at least one second strip in the second portion, there being spaces between fins associated with the first and second strips, spacing between fins associated with the first strip being less than spacing between fins associated with the second strip.

3. A mixing system comprising:
   a pipe in which a first fluid can flow in a flow direction, the pipe having an interior periphery having an interior peripheral shape
   a nozzle for injecting a second fluid inside the pipe from an injection inlet arranged in a wall of the pipe, according to an injection direction; and
   a mixing device for mixing of the first and second fluids inside the pipe, comprising a peripheral shape matching the interior peripheral shape of the pipe, and a central axis, a plurality of blades in an interior of the mixing device, the blades defining a plurality of strips and extending parallel to the central axis, and a plurality of fins associated with respective ones of the plurality of strips, the fins being angled with respect to the central axis, wherein the central axis lies along a diameter lane of the mixing device, the diameter plane defining a first portion and a second portion located on opposite sides of the diameter plane, wherein the blades are parallel to each other, and wherein a distance between blades is greater in the second portion than in the first portion.

4. A mixing system comprising:

a pipe in which a first fluid can flow in a flow direction, the pipe having an interior periphery having an interior peripheral shape;

a nozzle for injecting a second fluid inside the pipe from an injection inlet arranged in a wall of the pipe, according to an injection direction; and a mixing device for mixing of the first and second fluids inside the pipe, comprising a peripheral shape matching the interior peripheral shape of the pipe, and a central axis, a plurality of blades in an interior of the mixing device, the blades defining a plurality of strips and extending parallel to the central axis, and a plurality of fins associated with respective ones of the plurality of strips, the fins being angled with respect to the central axis, wherein the central axis lies along a diameter plane of the mixing device, the diameter plane defining a first portion and a second portion located on opposite sides of the diameter plane, and the mixing system comprising at least one first strip in the first portion and at least one second strip in the second portion, there being spaces between fins associated with the first and second strips, spacing between fins associated with the first strip being less than spacing between fins associated with the second strip.

* * * * *